US 9,937,789 B2

United States Patent
Imafuku et al.

(10) Patent No.: US 9,937,789 B2
(45) Date of Patent: Apr. 10, 2018

(54) VEHICLE POWER TRANSMISSION DEVICE

(71) Applicant: TOYOTA JIDOSHA KABUSHIKI KAISHA, Toyota-shi, Aichi-ken (JP)

(72) Inventors: Mizuki Imafuku, Kariya (JP); Akinori Homan, Toyota (JP); Tomohiro Arakawa, Komaki (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 384 days.

(21) Appl. No.: 14/873,527

(22) Filed: Oct. 2, 2015

(65) Prior Publication Data
US 2016/0101690 A1    Apr. 14, 2016

(30) Foreign Application Priority Data
Oct. 8, 2014 (JP) ................. 2014-207607

(51) Int. Cl.
| B60K 17/344 | (2006.01) |
| B60K 17/346 | (2006.01) |
| F16D 28/00 | (2006.01) |
| F16D 23/12 | (2006.01) |
| F16H 61/32 | (2006.01) |
| F16H 25/22 | (2006.01) |
| F16H 37/08 | (2006.01) |
| F16H 48/24 | (2006.01) |
| F16H 48/34 | (2012.01) |
| F16H 61/02 | (2006.01) |
| F16H 48/00 | (2012.01) |

(52) U.S. Cl.
CPC .......... *B60K 17/346* (2013.01); *B60K 17/344* (2013.01); *F16D 28/00* (2013.01); *F16H 25/2204* (2013.01); *F16H 37/0806* (2013.01); *F16H 48/24* (2013.01); *F16H 48/34* (2013.01); *F16H 61/0202* (2013.01); *F16H 61/32* (2013.01); *F16D 2023/123* (2013.01); *F16H 2048/02* (2013.01); *F16H 2048/343* (2013.01)

(58) Field of Classification Search
None
See application file for complete search history.

(56) References Cited

U.S. PATENT DOCUMENTS

| 6,099,430 A | 8/2000 | Winks |
| 2007/0251345 A1 | 11/2007 | Kriebernegg et al. |
| 2010/0107811 A1 | 5/2010 | McCloy |

*Primary Examiner* — Jacob S. Scott
(74) *Attorney, Agent, or Firm* — Oliff PLC

(57) ABSTRACT

In a transfer, a high thrust can be given to a front-wheel driving clutch by a high magnification function of a screw mechanism. Further, a necessary stroke for an operation of a high-low switching mechanism can be obtained by the screw mechanism. Accordingly, with the use of one motor, the screw mechanism, and a transmission mechanism, it is possible to perform a switching operation of the high-low switching mechanism and a torque adjustment of the front-wheel driving clutch by the same system. Hereby, it is possible to perform, with accuracy, the switching operation of the high-low switching mechanism and the torque adjustment of the front-wheel driving clutch, based on a motor rotation angle Am of one motor.

10 Claims, 6 Drawing Sheets

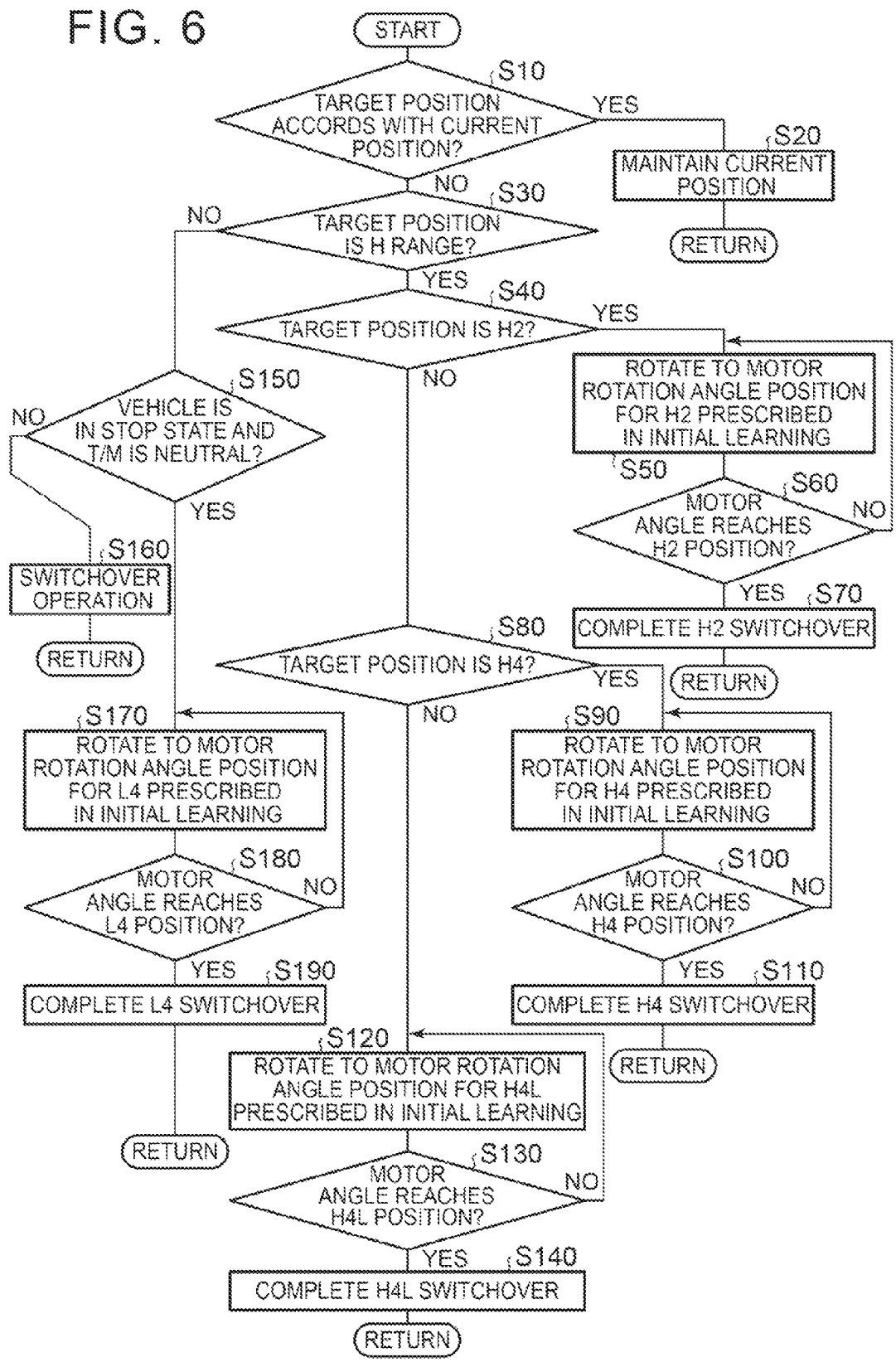

VEHICLE POWER TRANSMISSION DEVICE

INCORPORATION BY REFERENCE

The disclosure of Japanese Patent Application No. 2014-207607 filed on Oct. 8, 2014 including the specification, drawings and abstract is incorporated herein by reference in its entirety.

BACKGROUND OF THE INVENTION

1. Field of the Invention

The present invention relates to a vehicle power transmission device including: a transfer provided with an input rotational member, a first output rotational member, a second output rotational member, a high-low switching mechanism, and a clutch; and a control device for controlling an operation of the transfer.

2. Description of Related Art

There has been well known a transfer including: a high-low switching mechanism for changing a speed of a rotation of an input rotational member and transmitting it to a first output rotational member; and a single-disc or a multi-disc clutch for adjusting a transmission torque to be transmitted from the first output rotational member to a second output rotational member. For example, U.S. Patent Application Publication No. 2007/0251345 describes a transfer including a high-low switching mechanism and a multi-disc clutch for adjusting a torque to be transmitted to a sub-driving wheel side. In the transfer described in U.S. Patent Application Publication No. 2007/0251345, a switching operation of the high-low switching mechanism and a torque adjustment of the clutch are performed by one motor. On that account, in the transfer described in U.S. Patent Application Publication No. 2007/0251345, a conversion mechanism for converting a rotation of the motor into a linear motion employs a drum cam system for the switching operation of the high-low switching mechanism, and a ball-cam+lever system for the torque adjustment of the clutch. Further, in the transfer described in U.S. Patent Application Publication No. 2007/0251345, the rotation of the motor is decelerated and transmitted to an actuator shaft, and based on a signal value of a rotation angle sensor on the actuator shaft, respective controls on the switching operation of the high-low switching mechanism and the torque adjustment of the clutch are executed.

SUMMARY OF THE INVENTION

In the meantime, in the technique described in U.S. Patent Application Publication No. 2007/0251345, a drum cam is provided concentrically around the actuator shaft, so that the drum cam is rotated within a range of one turn (360°) of the actuator shaft. Accordingly, since a ball cam is also rotated within a range of one turn of the actuator shaft, it is necessary to perform the torque adjustment of the clutch within the range of one turn. In this case, control accuracy (resolution) in the torque adjustment of the clutch may be insufficient. In contrast, it is considered that, with the use of that rotation angle of the motor which is a rotation angle before deceleration, the control accuracy can be raised. Since the rotation angle sensor is a sensor for detecting an absolute position within the range of one turn, it is necessary to determine and store, in advance, a reference point of the rotation angle of the motor at the time when the torque adjustment of the clutch is performed, and to perform the torque adjustment based on a change amount of the rotation angle of the motor from the reference point. Further, in a case where the rotation angle of the motor is used for the switching operation of the high-low switching mechanism, it is necessary to determine, in advance, a reference point of the rotation angle of the motor, similarly to the torque adjustment of the clutch. In this case, it is conceivable that the same reference point used at the time of performing the torque adjustment of the clutch is used or a reference point at the time of performing the switching operation of the high-low switching mechanism is determined based on the reference point for the torque adjustment. However, respective controls on the switching operation of the high-low switching mechanism and the torque adjustment of the clutch employ different systems in the conversion mechanism for converting a rotation of the motor into a linear motion and the systems are operated by individual members. Accordingly, many component parts are required, which may possibly cause large position variations in a linear motion direction in the conversion mechanism. In view of this, it is necessary to set a stroke of the switching operation of the high-low switching mechanism with a margin, which may increase an overall length of the conversion mechanism in the linear motion direction. In order to avoid this, a reference point may be determined by use of a rotation angle of the motor so as to perform a control on the torque adjustment of the clutch, and a control may be performed on the switching operation of the high-low switching mechanism based on a signal value of the rotation angle sensor on the actuator shaft. However, this requires two rotation angle sensors, which causes an increase in cost. Note that the aforementioned problems are not publicly known.

The present invention provides a vehicle power transmission device that can avoid an increase in dimension for convenience of control and an increase in cost due to employing multiple sensors.

A power transmission device for a vehicle according to one aspect of the present invention is a power transmission device including: a transfer including an input rotational member, a first output rotational member configured to output a power to first right and left wheel assemblies, a second output rotational member configured to output a power to second right and left wheel assemblies, a high-low switching mechanism configured to change a speed of a rotation of the input rotational member and the high-low switching mechanism being configured to transmit the rotation to the first output rotational member, a clutch configured to adjust a transmission torque to be transmitted from the first output rotational member to the second output rotational member, a motor, a screw mechanism configured to convert a rotational motion of the motor into a linear motion, a transmission mechanism configured to transmit a linear motion force of the screw mechanism to the high-low switching mechanism and the clutch, and a rotation angle sensor configured to detect a rotation angle of the motor; and at least one electronic control unit configured to perform a switching operation of the high-low switching mechanism and adjustment of the transmission torque of the clutch, based on the rotation angle of the motor.

With such a configuration, a high thrust can be given to the clutch by a high magnification function of the screw mechanism in the transfer. Further, a necessary stroke for the operation of the high-low switching mechanism can be obtained by the screw mechanism. Accordingly, with the use of one motor, the screw mechanism, and the transmission mechanism, the switching operation of the high-low switching mechanism and the torque adjustment of the clutch (that is, adjustment of a transmission torque to be transmitted to the second output rotational member (in other words, second right and left wheel assemblies)) can be performed. That is, with the use of the screw mechanism as a conversion mechanism for converting a rotational motion of the motor into a linear motion, it is possible to perform the switching operation of the high-low switching mechanism and the torque adjustment of the clutch by the same system. Hereby, it is possible to perform, with accuracy, the switching operation of the high-low switching mechanism and the torque adjustment of the clutch, based on a rotation angle of one motor. As a result, it is possible to avoid an increase in dimension for convenience of control and an increase in cost due to employing multiple sensors in a vehicle power transmission device.

In the above aspect, the electronic control unit may be configured to i) perform the adjustment of the transmission torque of the clutch by taking, as a reference point, a rotation angle of the motor at which the transmission torque of the clutch exceeds a predetermined value, and ii) perform the switching operation of the high-low switching mechanism based on the reference point and a moving dimension in design in the linear motion of the screw mechanism. Hereby, it is possible to perform, with accuracy, the switching operation of the high-low switching mechanism and the torque adjustment of the clutch, based on a rotation angle of one motor.

In the above aspect, the electronic control unit may be configured to i) apply a predetermined current to the motor and rotate the motor such that the transmission torque of the clutch is generated, and ii) determine, as the reference point, one of a) a rotation angle at a time when the rotation of the motor stops, b) a rotation angle obtained by further rotating the motor by a predetermined reference angle from the rotation angle at a time when the rotation of the motor stops, and c) a rotation angle of the motor at a time when the current applied to the motor increases by a predetermined reference current. With such a configuration, it is possible to appropriately set the reference point for respective motor rotation angles based on which the switching operation of the high-low switching mechanism and the torque adjustment of the clutch are performed.

In the above aspect, the screw mechanism may include a rotational member connected to the motor, and a rectilinearly-movable member connected to the rotational member in a movable manner in a direction parallel to a shaft center of the rotational member along with a rotation of the rotational member; the high-low switching mechanism may include high-gear teeth configured to output a rotation, low-gear teeth configured to output a rotation at a lower speed than the high-gear teeth, and a high-low sleeve splined to the first output rotational member such that the high-low sleeve meshes with the high-gear teeth and the low-gear teeth along with a movement in a direction parallel to a shaft center of the first output rotational member; and the transmission mechanism may include a pressing member connected to the rectilinearly-movable member such that the pressing member presses the clutch, a fork shaft provided around another shaft center parallel to the shaft center of the rotational member and the fork shaft being connected to the rectilinearly-movable member, and a fork secured to the fork shaft and the fork being connected to the high-low sleeve. With such a configuration, the switching operation of the high-low switching mechanism and the torque adjustment of the clutch can be performed by one motor, the screw mechanism, and the transmission mechanism.

In the above aspect, the transfer may include lock teeth provided in the second output rotational member, and a dog clutch having a lock sleeve, the lock sleeve splined to the first output rotational member, so as to mesh with the lock teeth along with a movement in the direction parallel to the shaft center of the first output rotational member; and the transmission mechanism may be configured to transmit the linear motion force of the screw mechanism to the lock sleeve via the high-low sleeve. With such a configuration, a switching operation of the dog clutch (that is, power transmission/cutoff to the second output rotational member) can be performed by the same system using the screw mechanism in the transfer.

In the above aspect, the high-low sleeve may be provided in a space on a second-output-rotational-member side relative to a support bearing of the input rotational member; the lock sleeve may be provided in a space between the high-low switching mechanism and the second output rotational member such that the lock sleeve is adjacent to the high-low sleeve as a different member; and the transmission mechanism may include a first spring configured to bias the high-low sleeve and the lock sleeve such that the high-low sleeve and the lock sleeve are distanced from each other, and a second spring configured to bias the lock sleeve such that the lock sleeve separates from the lock teeth. With such a configuration, the high-low sleeve is movable regardless of whether the lock sleeve moves or not. Further, even in a case where the high-low sleeve is provided separately from the lock sleeve, if the high-low sleeve is moved toward a side to be distanced from the lock sleeve, the lock sleeve is moved toward a side to be distanced from the lock teeth.

In the above aspect, the high-low sleeve may mesh with the high-gear teeth on a side to be distanced from the lock sleeve; the high-low sleeve may mesh with the low-gear teeth on a side to approach the lock sleeve; the lock sleeve may mesh with the lock teeth at a position where the fork shaft meshes the high-low sleeve with the low-gear teeth; the clutch may be placed around the shaft center of the first output rotational member on an opposite side to the high-low switching mechanism across the second output rotational member in a shaft-center direction of the first output rotational member such that the clutch is pressed by the pressing member moving toward the second output rotational member; the clutch may be pressed by the pressing member at a position where the fork shaft meshes the high-low sleeve with the high-gear teeth and the clutch may not be pressed by the pressing member at a position where the fork shaft meshes the high-low sleeve with the low-gear teeth; the transmission mechanism may include a connecting mechanism configured to connect the rectilinearly-movable member to the fork shaft; and the connecting mechanism may be configured to allow the rectilinearly-movable member to move between a position where the clutch is pressed by the pressing member and a position where the clutch is not pressed by the pressing member, still at the position where the fork shaft meshes the high-low sleeve with the high-gear teeth. With such a configuration, in a vehicle state where the high-low sleeve is meshed with the high-gear teeth so that a rotation of a relatively high-speed side can be transmitted to the first output rotational member (in other words, first right and left wheel assemblies), a torque adjusted via a single-disc or multi-disc clutch can be transmitted to the second output rotational member (in other words, the second right and left wheel assemblies). Further, in this vehicle state, the lock sleeve is not meshed with the lock teeth, and the single-disc or multi-disc clutch can be set so as not to be pressed by the pressing member. Accordingly, a power can be transmitted to only the first right and left wheel assemblies. On the other hand, in a vehicle state where the high-low sleeve is meshed with the low-gear teeth, so that a rotation of a relatively low-speed side can be transmitted to the first output rotational member, the lock sleeve is meshed with the lock teeth, so that the first output rotational member is directly connected to the second output rotational member via the dog clutch.

In the above aspect, the electronic control unit may be configured to i) perform the adjustment of the transmission torque of the clutch, by taking, as a reference point, a position where the clutch is pressed by the pressing member by a predetermined amount at a position where the high-low sleeve meshes with the high gear teeth, and ii) perform the switching operation of the high-low switching mechanism based on the reference point and a moving dimension in design in the rectilinearly-movable member. With such a configuration, it is possible to perform, with accuracy, the switching operation of the high-low switching mechanism and the torque adjustment of the single-disc or multiple-disc clutch, based on a rotation angle of one motor.

In the above aspect, the electronic control unit may be configured to i) apply a predetermined current to the motor and rotate the motor such that the pressing member presses the clutch, ii) determine, as the reference point, one of a) a rotation angle at a time when the rotation of the motor stops, b) a rotation angle obtained by further rotating the motor by a predetermined reference angle from the rotation angle at a time when the rotation of the motor stops, and c) a rotation angle of the motor at a time when the current applied to the motor increases by a predetermined reference current, iii) store that rotation angle of the motor which is obtained by rotating the motor relative to the reference point just by a first predetermined rotation angle in a direction opposite to a direction in which the pressing member presses the clutch, the rotation angle being stored as a position where the clutch is not pressed by the pressing member at a position where the high-low sleeve meshes with the high gear teeth, and iv) store a rotation angle of the motor which is obtained by rotating the motor relative to the reference point just by a second predetermined rotation angle that is larger than the first predetermined rotation angle in a direction opposite to a direction in which the pressing member presses the clutch, the rotation angle being stored as a position where the high-low sleeve meshes with the low gear teeth and the lock sleeve meshes with the lock teeth. With such a configuration, the reference point for respective motor rotation angles based on which the switching operation of the high-low switching mechanism and the torque adjustment of the single-disc or multi-disc clutch are performed is set appropriately. Further, the motor can be controlled appropriately to a rotation angle for causing a vehicle state in which a rotation of a relatively high-speed side can be transmitted to the first output rotational member, based on the reference point. Further, in the vehicle state, the motor can be controlled appropriately to a rotation angle at which a torque adjusted via the single-disc or multi-disc clutch can be transmitted to the second output rotational member, based on the reference point. Further, in the vehicle state, the motor can be controlled appropriately to a rotation angle at which a power can be transmitted to only the first right and left wheel assemblies, based on the reference point. Further, the motor can be controlled appropriately to a rotation angle for causing a vehicle state in which a rotation of a relatively low-speed side can be transmitted to the first output rotational member, based on the reference point. Further, in the vehicle state, the motor can be controlled appropriately to a rotation angle at which the first output rotational member is directly connected to the second output rotational member via the dog clutch.

In the above aspect, the rotational member may be a screw shaft member, the rectilinearly-movable member may be a nut member, and the screw mechanism may be a ball screw configured such that the screw shaft member and the nut member operate via balls. With such a configuration, a high thrust can be given to the clutch by a high magnification function of the ball screw. Further, a necessary stroke for the operation of the high-low switching mechanism can be obtained by the ball screw. Further, in comparison with a case where a slide screw is used as a conversion mechanism for converting a rotational motion of a motor into a linear motion, mechanical efficiency to convert the rotational motion into the linear motion can be increased.

BRIEF DESCRIPTION OF THE DRAWINGS

Features, advantages, and technical and industrial significance of exemplary embodiments of the invention will be described below with reference to the accompanying drawings, in which like numerals denote like elements, and wherein:

FIG. 6 is a flowchart to describe an essential part of a control operation of an electronic control unit, that is, a control operation to avoid an increase in dimension for convenience of control and an increase in cost due to employing multiple sensors.

DETAILED DESCRIPTION OF EMBODIMENTS

An embodiment of the present invention will hereinafter be described in detail with reference to the drawings.

Figure 1:
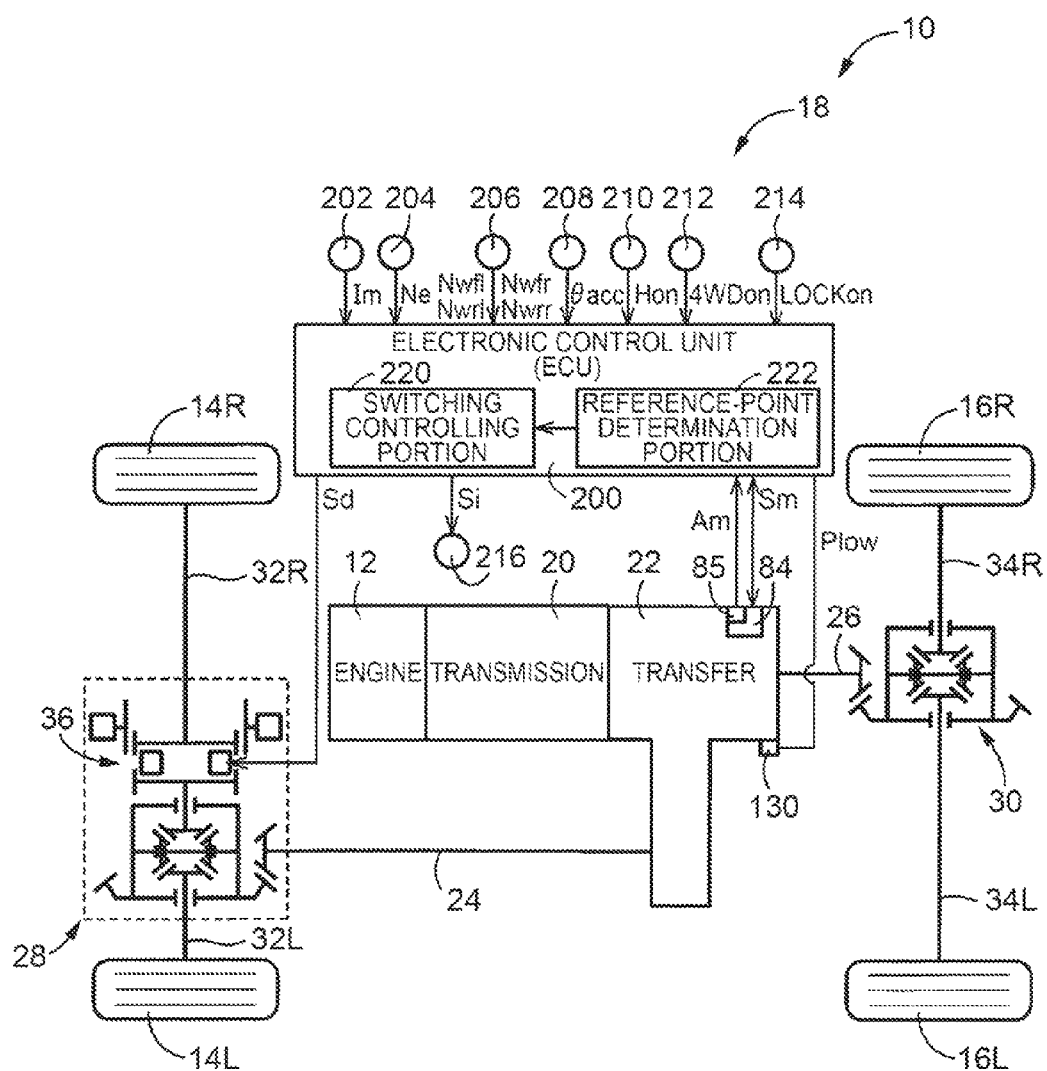
FIG. 1 is a view to describe a schematic configuration of a vehicle to which the present invention is applied, and also a view to describe an essential part of a control system for various controls in the vehicle.

FIG. 1 is a view to describe a schematic configuration of a vehicle 10 to which the present invention is applied, and also a view to describe an essential part of a control system for various controls in the vehicle 10. In FIG. 1, the vehicle 10 includes: an engine 12 as a driving force source; left and right front wheels 14L, 14R (just referred to as front wheels 14 in a case where they are not distinguished in particular); left and right rear wheels 16L, 16R (just referred to as rear wheels 16 in a case where they are not distinguished in particular); and a vehicle power transmission device 18 (hereinafter referred to as the power transmission device 18) for transmitting a power of the engine 12 to the front wheels 14 and the rear wheels 16. The rear wheels 16 are main driving wheels serving as driving wheels during both two-wheel drive (2WD) running, and four-wheel drive (4WD) running. The front wheels 14 are sub driving wheels serving as follower wheels during 2WD running and also serving as driving wheels during 4WD running. Accordingly, the vehicle 10 is a four-wheel drive vehicle based on front-engine rear wheel drive (FR).

The power transmission device 18 includes: a transmission (T/M) 20 connected to the engine 12; a transfer 22, which is a front-rear-wheel power distribution device connected to the transmission 20; a front propeller shaft 24 and a rear propeller shaft 26 each connected to the transfer 22; a front-wheel differential gear device 28 connected to the front propeller shaft 24; a rear-wheel differential gear device 30 connected to the rear propeller shaft 26; left and right front wheel axles 32L, 32R (just referred to as the front wheel axles 32 in a case where they are not distinguished in particular) connected to the front-wheel differential gear device 28; left and right rear wheel axles 34L, 34R (just referred to as the rear wheel axles 34 in a case where they are not distinguished in particular) connected to the rear-wheel differential gear mechanism 30; and so on. In the power transmission device 18 configured as such, that power of the engine 12 which is transmitted to the transfer 22 via the transmission 20 is transmitted to the rear wheels 16 from the transfer 22 via a rear-wheel-side power transmission path that sequentially passes through the rear propeller shaft 26, the rear-wheel differential gear device 30, the rear wheel axles 34, and so on. Further, that power of the engine 12 which is transmitted toward the rear wheels 16 is partially distributed toward the front wheels 14 by the transfer 22, and is transmitted to the front wheels 14 via a front-wheel-side power transmission path that sequentially passes through the front propeller shaft 24, the front-wheel differential gear device 28, the front wheel axles 32, and so on.

The front-wheel differential gear device 28 includes a front-side clutch 36 on a front-wheel-axle-32R side (that is, between the front-wheel differential gear device 28 and the front wheel 14R). The front-side clutch 36 is a dog clutch (that is, a claw clutch) electrically (electromagnetically) controlled so as to selectively connect or disconnect a power transmission path between the front-wheel differential gear device 28 and the front wheel 14R. Note that the front-side clutch 36 may further include a synchronization mechanism (a synchro mechanism).

Figure 2:
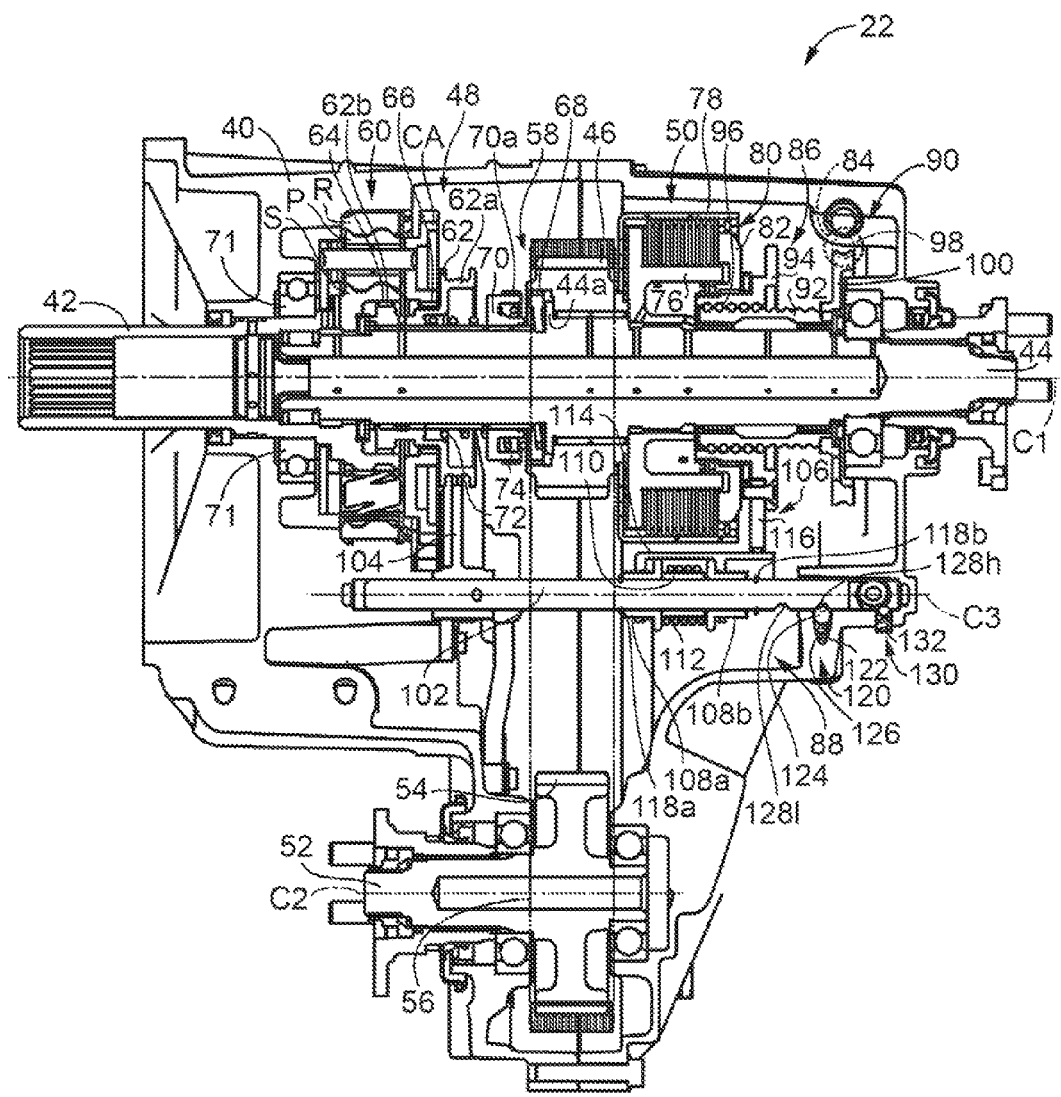
FIG. 2 is a sectional view to describe a schematic configuration of a transfer, and illustrates a mode for a 4WD running state with a high-speed gear.
Figure 3:
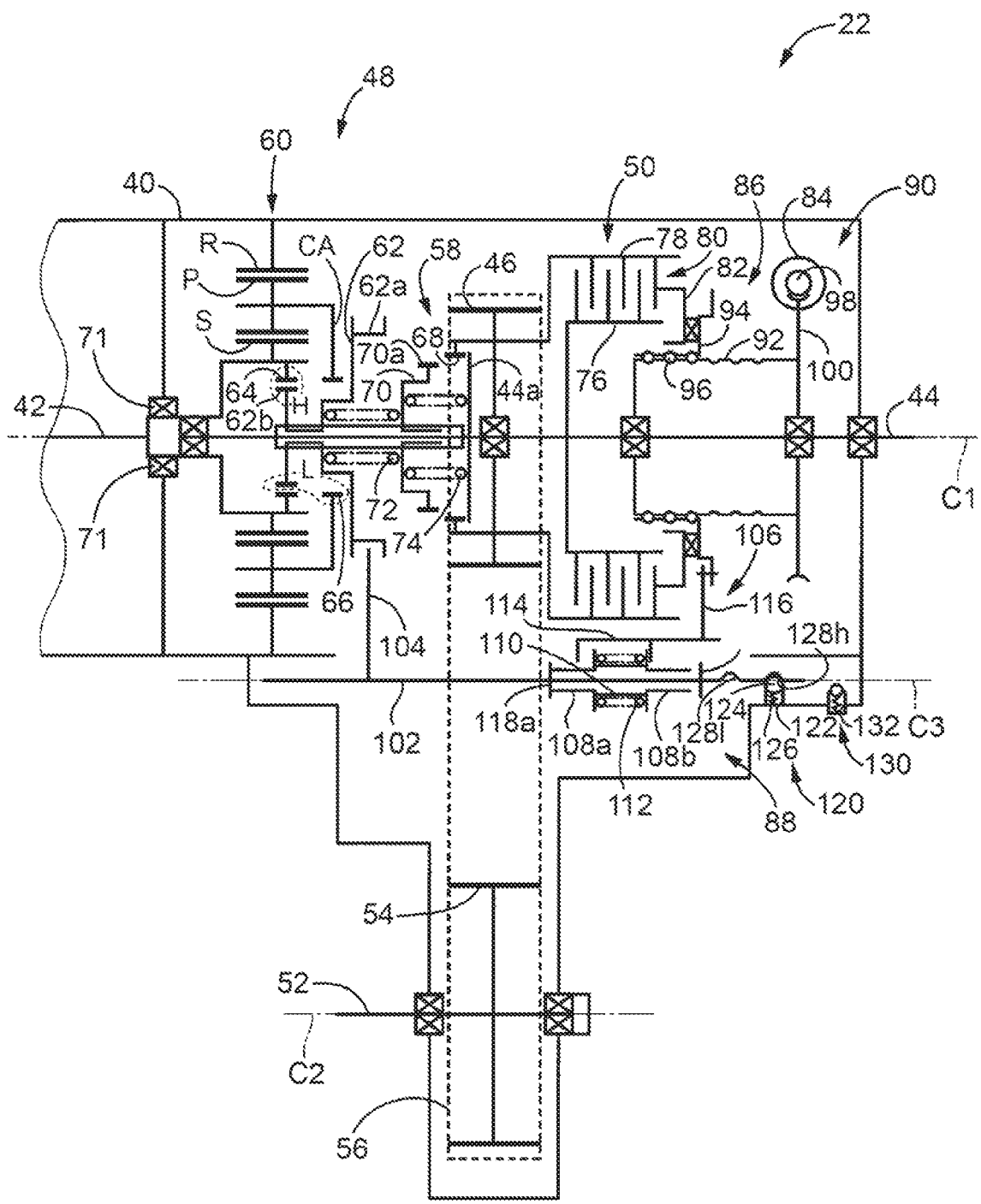
FIG. 3 is an outline view to describe the schematic configuration of the transfer.

FIGS. 2 and 3 are views to describe a schematic configuration of the transfer 22: FIG. 2 is a sectional view of the transfer 22, and FIG. 3 is an outline view of the transfer 22. In FIGS. 2, 3, the transfer 22 includes a transfer case 40 as a non-rotational member. The transfer 22 includes, inside the transfer case 40, an input shaft 42 as an input rotational member, a rear-wheel-side output shaft 44 as a first output rotational member for outputting a power to the rear wheels 16 as first right and left wheel assemblies, a drive gear 46 as a second output rotational member for outputting a power to the front wheels 14 as second right and left wheel assemblies, a high-low switching mechanism 48 as an auxiliary transmission for changing a speed of a rotation of the input shaft 42 and transmitting the rotation to the rear-wheel-side output shaft 44, and a front-wheel driving clutch 50 as a multi-disc clutch for adjusting a transmission torque to be transmitted from the rear-wheel-side output shaft 44 to the drive gear 46, and these members are provided around a common shaft center C1. Further, the transfer 22 includes, inside the transfer case 40, a front-wheel-side output shaft 52, and a driven gear 54 provided integrally in the front-wheel-side output shaft 52, each around a common shaft center C2. Further, the transfer 22 includes a front-wheel driving chain 56 for connecting the drive gear 46 to the driven gear 54, and a differential lock mechanism 58 as a dog clutch for integrally connecting the rear-wheel-side output shaft 44 to the drive gear 46.

The input shaft 42 is connected to an output rotational member (not shown) of the transmission 20 via a spline fitting joint, and is rotationally driven by a driving force (torque) input therein from the engine 12 via the transmission 20. The rear-wheel-side output shaft 44 is a main drive shaft connected to the rear propeller shaft 26. The drive gear 46 is provided around the rear-wheel-side output shaft 44 in a relatively rotatable manner. The front-wheel-side output shaft 52 is an auxiliary driving shaft connected to the front propeller shaft 24.

The transfer 22 thus configured, for example, adjusts a torque to be transmitted to the drive gear 46, so as to transmit, only to the rear wheels 16, a power transmitted from the transmission 20, or to distribute the power to the front wheels 14 and the rear wheels 16. Further, the transfer 22 switches from a differential state in which a rotational differential between the rear propeller shaft 26 and the front propeller shaft 24 is not limited, to a non-differential state (a so-called center differential lock state) in which the rotational differential therebetween is limited, and vice versa, for example. Further, the transfer 22, for example, establishes either of a high-speed gear (a high-speed gear stage) H and a low-speed gear (a low-speed gear stage) L so as to change a speed of a rotation from the transmission 20, and transmit the rotation to its subsequent stage. That is, the transfer 22 transmits the rotation of the input shaft 42 to the rear-wheel-side output shaft 44 via the high-low switching mechanism 48. Further, in a state where a transmission torque via the front-wheel driving clutch 50 is zero and the differential lock mechanism 58 is disengaged, the transfer 22 does not perform power transmission from the rear-wheel-side output shaft 44 to the front-wheel-side output shaft 52, but in a state where a torque is transmitted via the front-wheel driving clutch 50 or the differential lock mechanism 58 is engaged, the transfer 22 performs power transmission to the front-wheel-side output shaft 52 from the rear-wheel-side output shaft 44 via the drive gear 46, the front-wheel driving chain 56, and the driven gear 54.

More specifically, the high-low switching mechanism 48 includes a single-pinion planetary gear 60, and a high-low sleeve 62. The planetary gear 60 includes: a sun gear S connected to the input shaft 42 in a non-rotatable manner around the shaft center C1; a ring gear R placed generally concentrically to the sun gear S and connected to the transfer case 40 in a non-rotatable manner around the shaft center C1; and a carrier CA for supporting a plurality of pinion gears P meshing with the sun gear S and the ring gear R so as to spin and revolve around the sun gear S. Therefore, a rotation speed of the sun gear S is the same speed as the input shaft 42, and a rotation speed of the carrier CA is decelerated relative to the input shaft 42. High-gear teeth 64 are secured to an inner peripheral surface of the sun gear S, and low-gear teeth 66 having the same diameter as the high-gear teeth 64 are secured to the carrier CA. The high-gear teeth 64 are spline teeth related to establishment of the high-speed gear H for outputting a rotation with the same speed as the input shaft 42. The low-gear teeth 66 are spline teeth related to establishment of the low-speed gear L for outputting a rotation with a lower speed than the high-gear teeth 64. The high-low sleeve 62 is splined to the rear-wheel-side output shaft 44 in a relatively movable manner in a direction parallel to the shaft center C1, and includes a fork connection portion 62a, and outer peripheral teeth 62b provided adjacently and integrally with the fork connection portion 62a so as to mesh with the high-gear teeth 64 and the lower-gear 66 along with a movement of the rear-wheel-side output shaft 44 in a direction parallel to the shaft center C1. When the high-gear teeth 64 mesh with the outer peripheral teeth 62b, a rotation at the same speed as the input shaft 42 is transmitted to the rear-wheel-side output shaft 44, and when the low-gear teeth 66 mesh with the outer peripheral teeth 62b, a rotation decelerated relative to the rotation of the input shaft 42 is transmitted to the rear-wheel-side output shaft 44. The high-gear teeth 64 and the high-low sleeve 62 function as a high-speed gear clutch constituting the high-speed gear H, and the low-gear teeth 66 and the high-low sleeve 62 function as a low-speed gear clutch constituting the low-speed gear L. When the high-low sleeve 62 does not mesh with either of the high-gear teeth 64 and the low-gear teeth 66, the high-low switching mechanism 48 enters a power transmission cutoff state (a neutral state). At the time when the high-speed gear H is changed to the low-speed gear L or vice versa, the gears are changed via the power transmission cutoff state.

The differential lock mechanism 58 includes lock teeth 68 secured to an inner peripheral surface of the drive gear 46, and a lock sleeve 70 splined to the rear-wheel-side output shaft 44 in a relatively movable manner in the direction parallel to the shaft center C1 and including outer peripheral teeth 70a secured to an outer peripheral surface thereof. The outer peripheral teeth 70a mesh with the lock teeth 68 when the lock sleeve 70 moves in the direction parallel to the shaft center C1. In an engaged state of the differential lock mechanism 58 in which the outer peripheral teeth 70a of the lock sleeve 70 mesh with the lock teeth 68, the rear-wheel-side output shaft 44 and the drive gear 46 are rotated integrally, so that a center differential lock state is formed in the transfer 22.

The high-low sleeve 62 is provided in a space on a drive-gear-46 side relative to a support bearing 71 of the input shaft 42 (more specifically, relative to the planetary gear 60). The lock sleeve 70 is provided in a space between the high-low switching mechanism 48 and the drive gear 46 so as to be adjacent to the high-low sleeve 62 as a different member. The transfer 22 includes a first spring 72 (hereinafter referred to as the first spring 72) between the high-low sleeve 62 and the lock sleeve 70 so as to abut therewith, so that the first spring 72 biases the high-low sleeve 62 and the lock sleeve 70 toward respective sides distanced from each other. The transfer 22 includes a second spring 74 (hereinafter referred to as the second spring 74) between the drive gear 46 and the lock sleeve 70 so as to abut with a projection portion 44a of the rear-wheel-side output shaft 44 and the lock sleeve 70, so that the second spring 74 biases the lock sleeve 70 toward a side to be distanced from the lock teeth 68. The projection portion 44a is a flange portion of the rear-wheel-side output shaft 44 which flange portion is provided so as to project toward the lock teeth 68 in a radially inner space of the drive gear 46. The high-gear teeth 64 are provided at a position distanced from the lock sleeve 70 relative to the low-gear teeth 66, when viewed in the direction parallel to the shaft center C1. The outer peripheral teeth 62b of the high-low sleeve 62 mesh with the high-gear teeth 64 on a side (a left side in FIGS. 2, 3) on which the high-low sleeve 62 is distanced from the lock sleeve 70, and mesh with the low-gear teeth 66 on a side (a right side in FIGS. 2, 3) on which the high-low sleeve 62 approaches the lock sleeve 70. The outer peripheral teeth 70a of the lock sleeve 70 mesh with the lock teeth 68 on a side (a right side in FIGS. 2, 3) on which the lock sleeve 70 approaches the drive gear 46. Accordingly, the outer peripheral teeth 70a of the lock sleeve 70 mesh with the lock teeth 68 at a position where the high-low sleeve 62 meshes with the low-gear teeth 66.

The front-wheel driving clutch 50 is a multi-disc friction clutch including a clutch hub 76 connected to the rear-wheel-side output shaft 44 in a relatively non-rotatable manner, a clutch drum 78 connected to the drive gear 46 in a relatively non-rotatable manner, a frictional engagement element 80 inserted between the clutch hub 76 and the clutch drum 78 so as to selectively disconnect them, and a piston 82 for pressing the frictional engagement element 80. The front-wheel driving clutch 50 is provided around the shaft center C1 of the rear-wheel-side output shaft 44 so as to be placed on an opposite side to the high-low switching mechanism 48 across the drive gear 46 in a shaft-center-C1 direction of the rear-wheel-side output shaft 44, and the frictional engagement element 80 is pressed by the piston 82 moving toward the drive gear 46. When the piston 82 is moved toward a non-pressing side (a right side in FIGS. 2, 3), which is a side to be distanced from the drive gear 46 along the direction parallel to the shaft center C1, so as not to abut with the frictional engagement element 80, the front-wheel driving clutch 50 enters a disengaged state. In the meantime, when the piston 82 is moved toward a pressing side (a left side in FIGS. 2, 3), which is a side approaching the drive gear 46 along the direction parallel to the shaft center C1, so as to abut with the frictional engagement element 80, a transmission torque (a torque capacity) is adjusted by a moving amount of the piston 82, so that the front-wheel driving clutch 50 enters a slip state or an engaged state.

In a disengaged state of the front-wheel driving clutch 50 and in a disengaged state of the differential lock mechanism 58 in which the outer peripheral teeth 70a of the lock sleeve 70 do not mesh with the lock teeth 68, a power transmission path between the rear-wheel-side output shaft 44 and the drive gear 46 is cut off, so that the transfer 22 transmits a power transmitted from the transmission 20 only to the rear wheels 16. Further, in a slip state or an engaged state of the front-wheel driving clutch 50, the transfer 22 distributes the power transmitted from the transmission 20, to the front wheels 14 and the rear wheels 16. In the slip state of the front-wheel driving clutch 50, a rotational differential between the rear-wheel-side output shaft 44 and the drive gear 46 is permitted, so that a differential state (a non-center-differential-lock state) is formed in the transfer 22. In the engaged state of the front-wheel driving clutch 50, the rear-wheel-side output shaft 44 and the drive gear 46 are rotated integrally, so that a center differential lock state is formed in the transfer 22. When a transmission torque is controlled, the front-wheel driving clutch 50 can continuously change a torque split between the front wheels 14 and the rear wheels 16 from 0:100 to 50:50, for example.

As a device for operating the high-low switching mechanism 48, the front-wheel driving clutch 50, and the differential lock mechanism 58, the transfer 22 further includes a motor 84, a screw mechanism 86 for converting a rotational motion of the motor 84 into a linear motion, and a transmission mechanism 88 for transmitting a linear motion force of the screw mechanism 86 to the high-low switching mechanism 48, the front-wheel driving clutch 50, and the differential lock mechanism 58. The motor 84 is a brushless motor, for example, and further includes a rotation angle sensor 85 for detecting a rotation angle Am (hereinafter referred to as a motor rotation angle Am) of the motor 84, which rotation angle sensor 85 is built therein or provided on a motor shaft.

The screw mechanism 86 is placed around the same shaft center C1 as the rear-wheel-side output shaft 44, and includes a screw shaft member 92 as a rotational member indirectly connected to the motor 84 via a worm gear 90 provided in the transfer 22, and a nut member 94 as a rectilinearly-movable member connected to the screw shaft member 92 in a movable manner along the direction parallel to the shaft center C1 along with a rotation of the screw shaft member 92. The screw mechanism 86 is a ball screw configured such that the screw shaft member 92 and the nut member 94 operate via many balls 96. The worm gear 90 is a gear pair including a worm 98 formed integrally with the motor shaft of the motor 84, and a worm wheel 100 placed around the shaft center C1 and formed integrally with the screw shaft member 92. A rotation of the motor 84 is decelerated and transmitted to the screw shaft member 92 via the worm gear 90. The screw mechanism 86 converts that rotation of the motor 84 which is transmitted to the screw shaft member 92, into a linear motion of the nut member 94.

The transmission mechanism 88 is provided around another shaft center C3 parallel to the shaft center C1 of the screw shaft member 92, and includes a fork shaft 102 connected to the nut member 94, and a fork 104 secured to the fork shaft 102 and connected to the high-low sleeve 62. The transmission mechanism 88 transmits a linear motion force of the nut member 94 in the screw mechanism 86, to the high-low sleeve 62 of the high-low switching mechanism 48 via the fork shaft 102 and the fork 104. A force is mutually given to the high-low sleeve 62 and the lock sleeve 70 via the first spring 72, and further, a force is given to the lock sleeve 70 from the projection portion 44a of the rear-wheel-side output shaft 44 via the second spring 74. Accordingly, the transmission mechanism 88 transmits the linear motion force of the nut member 94 in the screw mechanism 86 to the lock sleeve 70 of the differential lock mechanism 58 via the high-low sleeve 62. On that account, the first spring 72 and the second spring 74 function as members constituting part of the transmission mechanism 88.

The screw mechanism 86 is placed on an opposite side to the drive gear 46 across the front-wheel driving clutch 50. The piston 82 of the front-wheel driving clutch 50 is connected to the nut member 94 of the screw mechanism 86 in a relatively non-movable manner in the direction parallel to the shaft center C1 and in a relatively rotatable manner around the shaft center C1. Accordingly, the linear motion force of the nut member 94 in the screw mechanism 86 is transmitted to the frictional engagement element 80 of the front-wheel driving clutch 50 via the piston 82. On that account, the piston 82 is a pressing member connected to the nut member 94 and configured to press the frictional engagement element 80 of the front-wheel driving clutch 50, and functions as a member constituting part of the transmission mechanism 88. As such, the transmission mechanism 88 transmits the linear motion force of the nut member 94 in the screw mechanism 86 to the frictional engagement element 80 of the front-wheel driving clutch 50.

The transmission mechanism 88 includes a connecting mechanism 106 for connecting the nut member 94 to the fork shaft 102. The connecting mechanism 106 includes: two flanged cylindrical members 108a, 108b placed around the shaft center C3 so as to be slidable over the fork shaft 102 in a direction parallel to the shaft center C3 and configured such that respective flanges provided on one ends thereof are opposed to each other; a cylindrical spacer 110 provided between the two flanged cylindrical members 108a, 108b; a third spring 112 (hereinafter referred to as the third spring 112) placed on an outer peripheral side of the spacer 110; a gripping member 114 for gripping the two flanged cylindrical members 108a, 108b so as to be slidable in the direction parallel to the shaft center C3; and a connecting member 116 for connecting the gripping member 114 to the nut member 94. The gripping member 114 abuts with the flanges of the flanged cylindrical members 108a, 108b, so as to slide the flanged cylindrical members 108a, 108b over the fork shaft 102. A distance between the flanges in a state where the flanges of the flanged cylindrical members 108a, 108b both abut with the gripping member 114 is longer than a length of the spacer 110. Accordingly, a state where the flanges both abut with the gripping member 114 is formed by a biasing force of the third spring 112.

The fork shaft 102 includes, on its outer peripheral surface, stoppers 118a, 118b that respectively cause the flanged cylindrical members 108a, 108b to be non-slidable in the direction parallel to the shaft center C3. Since the flanged cylindrical members 108a, 108b are made non-slidable by the stoppers 118a, 118b, the transmission mechanism 88 can transmit the linear motion force of the nut member 94 to the high-low switching mechanism 48 via the fork shaft 102 and the fork 104.

The outer peripheral teeth 70a of the lock sleeve 70 mesh with the lock teeth 68 at a position (referred to as a low gear position) where the fork shaft 102 meshes the outer peripheral teeth 62b of the high-low sleeve 62 with the low-gear teeth 66. The frictional engagement element 80 of the front-wheel driving clutch 50 is pressed by the piston 82 at a position (referred to as a high gear position) where the fork shaft 102 engages the outer peripheral teeth 62b of the high-low sleeve 62 with the high-gear teeth 64, but the frictional engagement element 80 is not pressed by the piston 82 at the low gear position of the fork shaft 102.

At the high gear position of the fork shaft 102, the length between the flanges of the flanged cylindrical members 108a, 108b can be changed between a length in a state where the flanges abut with the gripping member 114 and a length of the spacer 110. Accordingly, with the fork shaft 102 being kept at the high gear position, the connecting mechanism 106 allows the nut member 94 to move along the direction parallel to the shaft center C1, between a position where the frictional engagement element 80 of the front-wheel driving clutch 50 is pressed by the piston 82 and a position where the frictional engagement element 80 is not pressed.

The transfer 22 includes a gear position maintaining mechanism 120 for maintaining the fork shaft 102 at the high gear position and the fork shaft 102 at the low gear position. The gear position maintaining mechanism 120 includes: a receiving hole 122 formed on that inner peripheral surface of the transfer case 40 on which the fork shaft 102 slides; a locking ball 124 accommodated in the receiving hole 122; a lock spring 126 for biasing the locking ball 124 accommodated in the receiving hole 122, toward the fork shaft 102; and a recessed portion 128h for receiving part of the locking ball 124 at the high gear position of the fork shaft 102 and a recessed portion 128l for receiving part of the locking ball 124 at the low gear position of the fork shaft 102, both formed on an outer peripheral surface of the fork shaft 102. Since the fork shaft 102 is maintained at each gear position by the gear position maintaining mechanism 120, even if an output from the motor 84 is stopped at the each gear position, the fork shaft 102 can be maintained at the each gear position.

The transfer 22 includes a low gear position sensing switch 130 for detecting the low gear position of the fork shaft 102. For example, the low gear position sensing switch 130 is a ball-type contact switch. The low gear position sensing switch 130 is secured to a through hole 132 formed in the transfer case 40 at a position making contact with the fork shaft 102 that moves to the low gear position.

Referring back to FIG. 1, the power transmission device 18 includes an electronic control unit (ECU) 200 including a control device for executing a switching control or the like to switch between a 2WD state and a 4WD drive state, for example. The electronic control unit 200 includes, for example, a so-called microcomputer provided with a CPU, a RAM, a ROM, an input-output interface, and the like, and the CPU uses a temporary memory function of the RAM and performs signal processing according to a program stored in the ROM in advance, so as to execute various controls of the power transmission device 18. For example, the electronic control unit 200 is configured to be separated from a control device for engine control, and the like, as needed. As illustrated in FIG. 1, various actual values (e.g., a motor rotation angle Am, a driving current Im of the motor 84 (hereinafter referred to as a motor driving current Im), an engine speed Ne, respective wheel rotation rates Nwfl, Nwfr, Nwrl, Nwrr of the front wheels 14L, 14R and the rear wheels 16L, 16R, an accelerator opening degree θacc, an H-range request Hon as a signal indicating that an H-range selecting switch 210 is operated, a 4WD request 4WDon as a signal indicating that a 4WD selecting switch 212 is operated, a signal LOCKon indicating that a differential lock selecting switch 214 is operated, a low gear position detection signal Plow as a signal indicating that the fork shaft 102 is moved to a low gear position, and the like) based on detection signals from various sensors provided in the vehicle 10 (e.g., the rotation angle sensor 85, a driving current sensor 202, an engine speed sensor 204, each wheel speed sensor 206, an accelerator opening degree sensor 208, the H-range selecting switch 210 for selecting the high-speed gear H by an operation of a driver, the 4WD selecting switch 212 for selecting a 4WD state by an operation of the driver, the differential lock selecting switch 214 for selecting a center differential lock state by an operation of the driver, the low gear position sensing switch 130, and the like) are supplied to the electronic control unit 200. As illustrated in FIG. 1, the electronic control unit 200 outputs, to an actuator on a front-side-clutch-36 side, the motor 84, an indicator 216, and the like, an operation instruction signal Sd to change a state of the front-side clutch 36, a motor drive instruction signal Sm to control a rotational amount of the motor 84 based on a motor rotation angle Am, an instruction signal Si to turn on an indicator 216 provided in the vehicle 10 and configured to inform the driver that a center differential lock state is established at the low-speed gear L, based on a low gear position detection signal Plow, and the like, for example.

The electronic control unit 200 includes switching control means, that is, a switching controlling portion 220. The switching controlling portion 220 controls a moving amount of the nut member 94 by controlling a rotational amount of the motor 84 based on a motor rotation angle Am. The moving amount of the nut member 94 is a moving amount of the fork shaft 102 along a shaft-center-C3 direction, and also a moving amount of the piston 82 along the shaft-center-C1 direction. Accordingly, the switching controlling portion 220 performs a switching operation of the high-low switching mechanism 48 and adjustment of a transmission torque of the front-wheel driving clutch 50, based on the motor rotation angle Am. Note that the moving amount of the nut member 94 corresponds to the moving amount of the piston 82 on a one-to-one basis. However, as described above, when the fork shaft 102 is at the high gear position, the nut member 94 is allowed to move without moving the fork shaft 102 from the high gear position. On this account, the moving amount of the nut member 94 does not necessarily correspond to the moving amount of the fork shaft 102 on a one-to-one basis.

Here, in order to perform the switching operation of the high-low switching mechanism 48 and the adjustment of a transmission torque of the front-wheel driving clutch 50 based on the motor rotation angle Am, a reference point of the motor rotation angle Am is required. The switching controlling portion 220 performs the adjustment of a transmission torque of the front-wheel driving clutch 50 by taking, as a reference point, a motor rotation angle Am (e.g., a position where the frictional engagement element 80 of the front-wheel driving clutch 50 is pressed by the piston 82 by a predetermined amount at the high gear position of the fork shaft 102) corresponding to that position of the motor 84 at which the transmission torque of the front-wheel driving clutch 50 exceeds a predetermined value. Further, the switching controlling portion 220 performs the switching operation of the high-low switching mechanism 48 based on the reference point and a moving dimension in design in a linear motion of the screw mechanism 86 (the nut member 94, in particular).

In the meantime, the reference point used herein may be a reference point that is found and stored in advance by experiment or on a design basis (that is, a predetermined reference point), but in consideration of individual variations and variations with time, it is desirable to determine the reference point by initial learning after assembling of the transfer 22 (more preferably, further by learning every predetermined time or learning every predetermined running distance).

Figure 4:
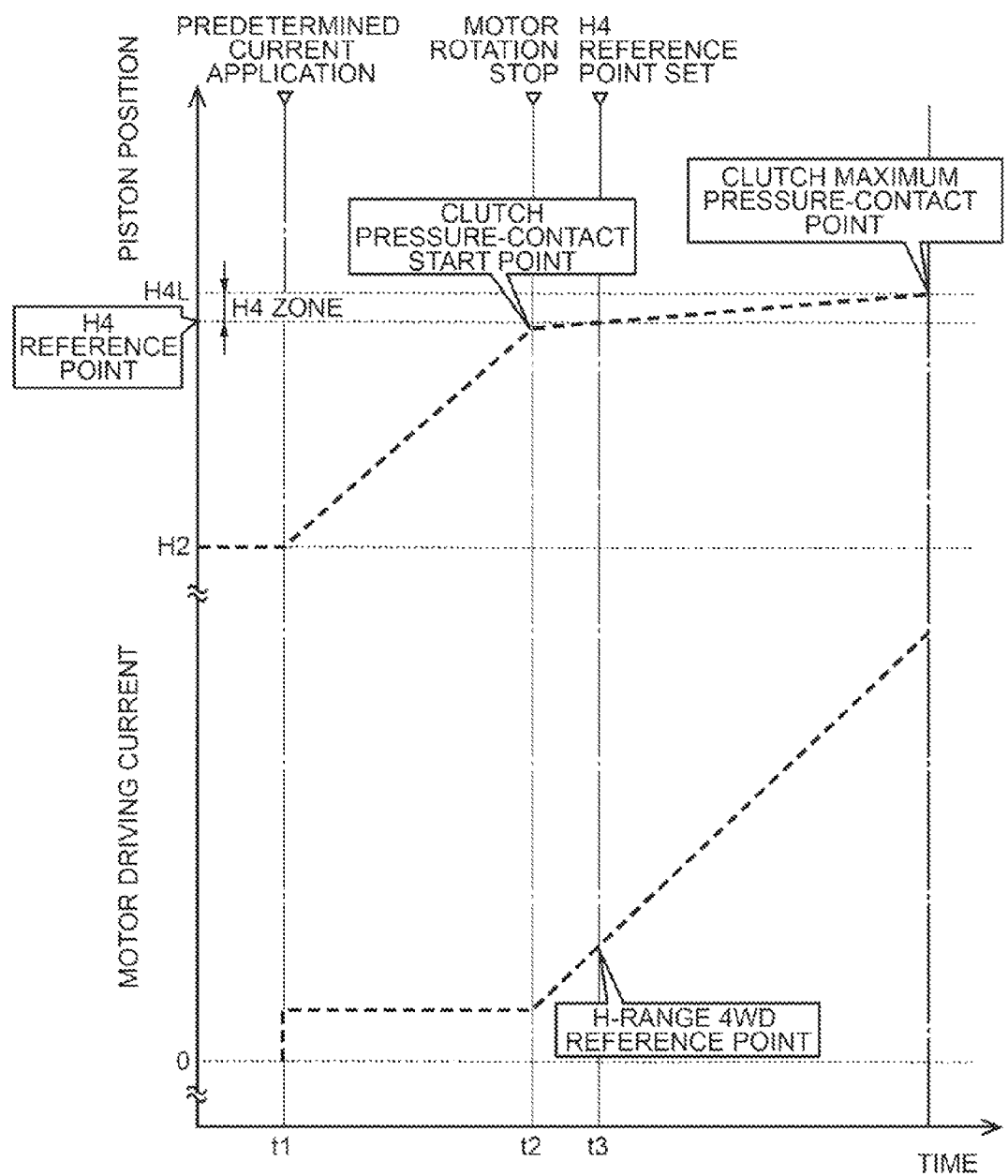
FIG. 4 is a view illustrating an exemplary motor driving current and an exemplary piston position on the same time sequence in an overlapping manner, so as to describe a reference point.

FIG. 4 is a view illustrating a motor driving current Im and a position of the piston 82 on the same time sequence in an overlapping manner at the time when the motor 84 is rotated at the high gear position of the fork shaft 102, and is a view to describe the reference point.

In FIG. 4, an H4-zone is a position (that is, a position where the frictional engagement element 80 of the front-wheel driving clutch 50 is pressed by the piston 82) at which the front-wheel driving clutch 50 is in a slip state or an engaged state (here, a completely engaged state) at the high gear position of the fork shaft 102, and is a position for causing the vehicle 10 to enter a 4WD running state in which a power is transmitted to both the front wheels 14 and the rear wheels 16 at the high-speed gear H. In the H4 zone, the transmission torque of the front-wheel driving clutch 50 is controlled, so that a torque split between the front wheels 14 and the rear wheels 16 is adjusted as needed.

Within the H4 zone, a position at which the piston 82 is moved closest to a non-pressing side is an H-range 4WD reference point as the reference point (hereinafter referred to as an H4 reference point). That is, the H4 reference point is a position at which pressing of the frictional engagement element 80 by the piston 82 is started, so that a transmission torque of the front-wheel driving clutch 50 starts to generate a transmission torque. In FIG. 4, the H4 reference point is set at a position where the piston 82 is moved only by a predetermined amount toward a pressing side from a position (a clutch pressure-contact start point in the figure) where the piston 82 abuts with the frictional engagement element 80. The predetermined amount is a moving amount (that is, a moving dimension in design in the linear motion of the nut member 94) from that clutch pressure-contact start point of the piston 82 which is determined in advance so as to obtain a piston position (the same meaning as a moving position in the linear motion of the nut member 94) at which a transmission torque of the front-wheel driving clutch 50 surely starts to be generated (that is, the transmission torque exceeds a predetermined value), for example.

In the H4 zone, a position at which the piston 82 is moved closest to the pressing side is a position (a clutch maximum pressure-contact point in the figure) where the piston 82 presses the frictional engagement element 80 to the maximum, and is an H4L position at which the front-wheel driving clutch 50 enters an engaged state. The H4L position is a position for causing the vehicle 10 to enter a 4WD running state in a center differential lock state at the high-speed gear H. In FIG. 4, the H4L position is set to a position where the piston 82 is moved from the H4 reference point toward the pressing side only by a predetermined engaged amount. The predetermined engaged amount is, for example, a moving amount (that is, the aforementioned moving dimension) from that predetermined H4 reference point of the piston 82 which achieves a piston position at which the front-wheel driving clutch 50 enters an engaged state. Note that, in the H4 zone, positions other than the H4L position are positions at which the front-wheel driving clutch 50 enters a slip state. In view of this, in the present embodiment, the positions other than the H4L position are referred to as an H4 position and distinguished from the H4L position.

Further, an H2 position is a position (that is, a position where the frictional engagement element 80 of the front-wheel driving clutch 50 is not pressed by the piston 82) where the front-wheel driving clutch 50 enters a disengaged state at the high gear position of the fork shaft 102, and is a position for causing the vehicle 10 to enter a 2WD running state in which only the rear wheels 16 are driven at the high-speed gear H. In FIG. 4, the H2 position is set to a position where the piston 82 is moved only by a predetermined disengaged amount from the H4 reference point toward a non-pressing side. The predetermined disengaged amount is, for example, a predetermined moving amount (that is, the aforementioned moving dimension) from the H4 reference point of the piston 82 which predetermined moving amount achieves a piston position at which the front-wheel driving clutch 50 surely enters a disengaged state still at the high gear position of the fork shaft 102. When the front-side clutch 36 enters a disengaged state at the H2 position, no rotation is transmitted from an engine-12 side or a front-wheel 14 side to each rotating element (the drive gear 46, the front-wheel driving chain 56, the driven gear 54, the front-wheel-side output shaft 52, the front propeller shaft 24, the front-wheel differential gear device 28, and the like) constituting a power transmission path from the drive gear 46 to the front-wheel differential gear device 28 during 2WD running. Accordingly, during 2WD running, these rotating elements stop rotating, so that corotation of the rotating elements is prevented, thereby reducing a running resistance.

Figure 5:
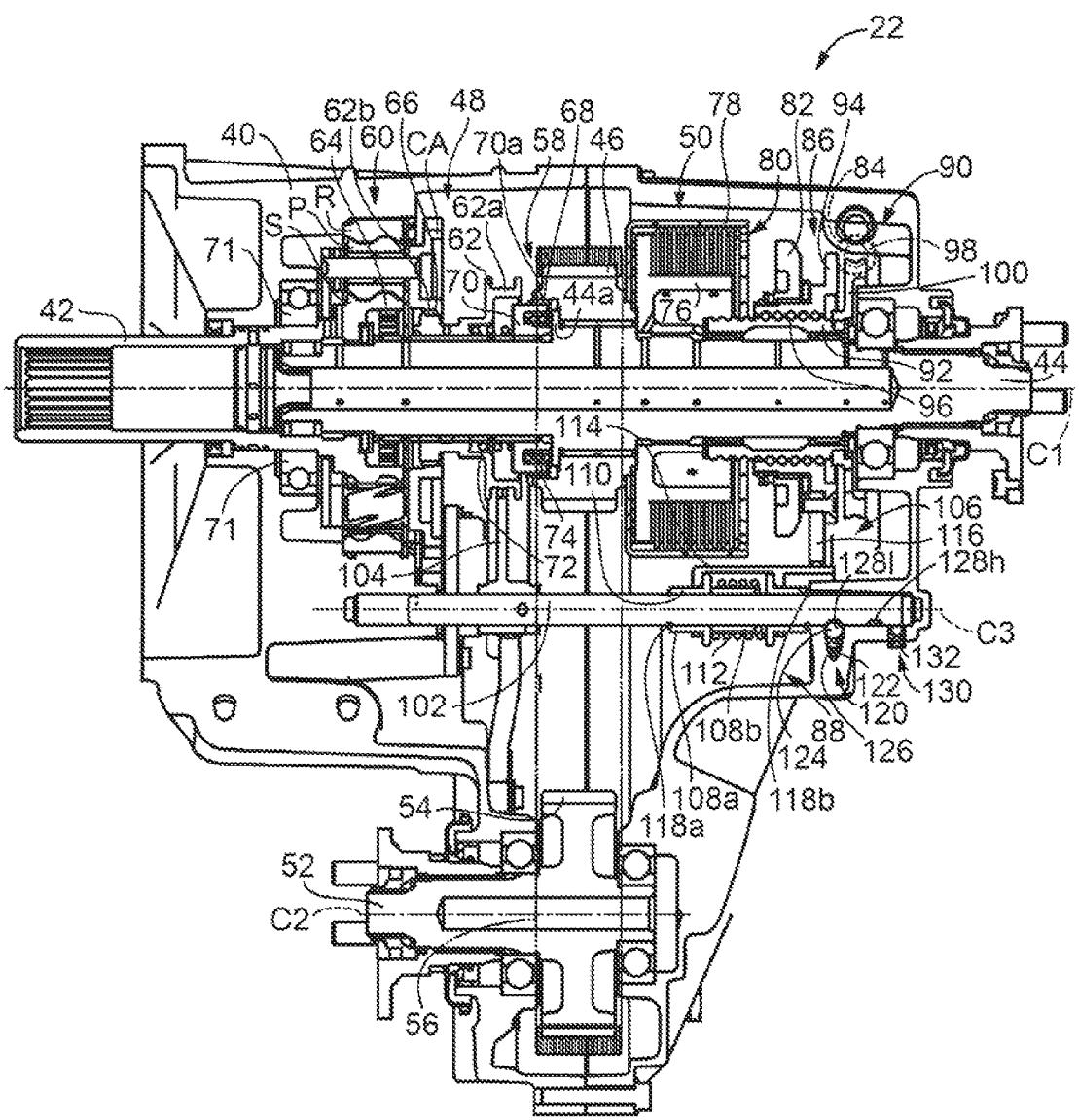
FIG. 5 is a sectional view to describe the schematic configuration of the transfer, and illustrates a mode for a 4WD running state in a center differential lock state with a low-speed gear.

Further, in the present embodiment, as illustrated in FIG. 5, a position where the fork shaft 102 is at the low gear position and the outer peripheral teeth 70a of the lock sleeve 70 mesh with the lock teeth 68 is referred to as an L4 position (not shown in FIG. 4) where the front-wheel driving clutch 50 enters a disengaged state and the differential lock mechanism 58 enters an engaged state. The L4 position is a position for causing the vehicle 10 to enter a 4WD running state in a center differential lock state at the low-speed gear L. The L4 position is set to a position where the piston 82 is moved only by a predetermined low-gear disengaged amount from the H4 reference point toward the non-pressing side. The predetermined low-gear disengaged amount is, for example, a moving amount (that is, the aforementioned moving dimension) from that predetermined H4 reference point of the piston 82 which achieves a piston position at which the fork shaft 102 is placed at the low gear position.

The electronic control unit 200 further includes reference-point determination means for determining a reference point by learning, that is, a reference-point determination portion 222. The reference-point determination portion 222 applies a predetermined current to the motor 84 with the fork shaft 102 being at a predetermined high gear position to be used for determination of the H4 reference point, so that the motor 84 is rotated toward a side where a transmission torque of the front-wheel driving clutch 50 is generated (that is, toward a side where the piston 82 presses the frictional engagement element 80 of the front-wheel driving clutch 50). Then, the reference-point determination portion 222 determines, as the H4 reference point, a motor rotation angle Am obtained by further rotating the motor 84 just by a predetermined reference angle from a motor rotation angle Am corresponding to a position at the time when a rotation of the motor 84 stops. The predetermined current is a predetermined motor driving current Im to output a motor torque Tm with a magnitude to such an extent that the nut member 94 is allowed to move in the shaft-center-C1 direction until the piston 82 abuts with the frictional engagement element 80 but the nut member 94 is not allowed to move after the piston 82 abuts with the frictional engagement element 80. Further, the position at the time when the rotation of the motor 84 stops is the clutch pressure-contact start point in FIG. 4. Further, the predetermined reference angle is, for example, a predetermined rotation amount (motor rotation angle Am) of the motor 84 to move the piston 82 toward the pressing side from the clutch pressure-contact start point just by a predetermined amount.

Here, as illustrated in FIG. 4, the motor driving current Im is gradually increased as the piston 82 is moved toward the pressing side from the clutch pressure-contact start point. That is, when the motor 84 is set to a motor rotation angle Am that moves the piston 82 toward the pressing side from the clutch pressure-contact start point, the motor driving current Im is naturally increased to be larger than the predetermined current. In view of this, instead of determining, as the H4 reference point, a motor rotation angle Am obtained by rotating the motor 84 by the predetermined reference angle, the reference-point determination portion 222 may determine, as the H4 reference point, a motor rotation angle Am at the time when the current applied to the motor 84 is increased to be larger than the predetermined current by a predetermined reference current. The predetermined reference current is a motor driving current Im to be increased at the time when the motor 84 is rotated by the predetermined reference angle, for example. Note that, in a case where the H4 reference point is determined based on the motor driving current Im, when the motor 84 is driven by setting, to a target value, a motor rotation angle Am that can surely move the piston 82 toward the pressing side relative to the H4 reference point, the rotation of the motor 84 does not stop at the clutch pressure-contact start point.

The switching controlling portion 220 stores, as the H4L position, a motor rotation angle Am obtained by rotating the motor 84 by a predetermined engagement rotation angle toward a side where the piston 82 presses the frictional engagement element 80, relative to the H4 reference point determined by the reference-point determination portion 222. The predetermined engagement rotation angle is a motor rotation angle Am that is determined in advance to move the piston 82 toward the pressing side from the H4 reference point just by a predetermined engagement amount. Further, the switching controlling portion 220 stores, as the H4 position, that range of the motor rotation angle Am which is not less than a motor rotation angle Am corresponding to the H4 reference point but less than a motor rotation angle Am corresponding to the H4L position.

The switching controlling portion 220 stores, as the H2 position, a motor rotation angle Am obtained by rotating the motor 84 by a first predetermined rotation angle toward a side where the piston 82 does not press the frictional engagement element 80, relative to the H4 reference point determined by the reference-point determination portion 222. The first predetermined rotation angle is, for example, a motor rotation angle Am that is determined in advance to move the piston 82 toward the non-pressing side from the H4 reference point just by a predetermined disengaged amount.

The switching controlling portion 220 stores, as the L4 position, a motor rotation angle Am obtained by rotating the motor 84 by a second predetermined rotation angle, which is larger than the first predetermined rotation angle, toward a side where the piston 82 does not press the frictional engagement element 80, relative to the H4 reference point determined by the reference-point determination portion 222. The second predetermined rotation angle is, for example, a motor rotation angle Am that is determined in advance to move the piston 82 toward the non-pressing side from the H4 reference point just by a predetermined low-gear disengaged amount.

At the time when the switching controlling portion 220 stores the H4 position, the H4L position, the H2 position, and the L4 position by learning relative to the H4 reference point, the switching controlling portion 220 determines respective positions by calculation, for example, and stores them without actually rotating the motor 84 to those positions.

The switching controlling portion 220 switches the fork shaft 102 between the high gear position and the low gear position in a neutral state of the transmission 20 at the time when the vehicle 10 stops, for example. On that account, when a phase of the outer peripheral teeth 70a of the lock sleeve 70 does not accord with that of the lock teeth 68 in the differential lock mechanism 58, there is a possibility that engagement and disengagement cannot be switched smoothly. With respect to such a problem, since the high-low sleeve 62 is provided separately from the lock sleeve 70, even if the lock sleeve 70 cannot be moved at the time when the switching controlling portion 220 switches the fork shaft 102 between the high gear position and the low gear position, the high-low sleeve 62 can be moved. Accordingly, at the time when the fork shaft 102 is switched between the high gear position and the low gear position, the movement of the high-low sleeve 62 is never stopped at a position where the high-low switching mechanism 48 enters a neutral state, so that power transmission to at least the rear wheels 16 is secured.

FIG. 6 is a flowchart to describe an essential part of a control operation of the electronic control unit 200, that is, a control operation to avoid an increase in dimension for convenience of control and an increase in cost due to employing multiple sensors. For example, the control operation is performed repeatedly for an extremely short cycle time of around a few msec to several tens msec. The switching controlling portion 220 performs each step in FIG. 6.

In FIG. 6, first, in step S10 (hereinafter "step" is omitted), a target position is calculated based on various actual values (e.g., respective wheel rotation rates Nwfl, Nwfr, Nwrl, Nwrr, an accelerator opening degree θacc, an H-range request Hon, a 4WD request 4WDon, LOCKon, and the like) based on detection signals from various sensors, for example, and it is determined whether or not the target position accords with a current position. When the determination in S10 is YES, the current position is maintained in S20. When the determination in S10 is NO, it is determined whether or not the target position is an H range, in S30. When the determination in S30 is YES, it is determined whether or not the target position is the H2 position, in S40. When the determination in S40 is YES, the motor 84 is rotated to that motor rotation angle Am at the H2 position which is prescribed (stored) based on the H4 reference point determined by the reference-point determination portion 222 in initial learning, in S50. Subsequently, in S60, it is determined whether or not the motor rotation angle Am reaches the H2 position. When the determination in S60 is NO, the step is returned to S50. When the determination in S60 is YES, switchover to the H2 position is completed in S70. When the determination in S40 is NO, it is determined whether or not the target position is the H4 position, in S80. When the determination in S80 is YES, the motor 84 is rotated to that motor rotation angle Am at the H4 position which is prescribed based on the H4 reference point in initial learning, in S90. Subsequently, in S100, it is determined whether or not the motor rotation angle Am reaches the H4 position. When the determination in S100 is NO, the step is returned to S90. When the determination in S100 is YES, switchover to the H4 position is completed in S110. When the determination in S80 is NO, the motor 84 is rotated to that motor rotation angle Am at the H4L position which is prescribed based on the H4 reference point in initial learning, in S120. Subsequently, in S130, it is determined whether or not the motor rotation angle Am reaches the H4L position. When the determination in S130 is NO, the step is returned to S120. When the determination in S130 is YES, switchover to the H4L position is completed in S140. When the determination in S30 is NO, it is determined whether or not the vehicle 10 is in a stop state and the transmission 20 is in a neutral state, in S150. In a case where the determination in S150 is NO, if the vehicle 10 is in a stop state, a switchover operation of the transmission 20 to a neutral state is performed, or if the vehicle 10 is not in a stop state, the switchover operation is suspended until the vehicle 10 enters a stop state, in S160. When the determination in S150 is YES, the motor 84 is rotated to that motor rotation angle Am at the L4 position which is prescribed based on the H4 reference point in initial learning, in S170. Subsequently, in S180, it is determined whether or not the motor rotation angle Am reaches the L4 position. When the determination in S180 is NO, the step is returned to S170. When the determination in S180 is YES, switchover to the L4 position is completed in S190.

As described above, according to the present embodiment, since the transfer 22 includes the motor 84, the screw mechanism 86, and the transmission mechanism 88, a high thrust can be given to the front-wheel driving clutch 50 by a high magnification function of the screw mechanism 86. Further, a necessary stroke for the operation of the high-low switching mechanism 48 can be obtained by the screw mechanism 86. Accordingly, with the use of one motor 84, the screw mechanism 86, and the transmission mechanism 88, the switching operation of the high-low switching mechanism 48 and the torque adjustment of the front-wheel driving clutch 50 (that is, the adjustment of the transmission torque to be transmitted to the drive gear 46 (in other words, the front wheels 14)) can be performed. That is, with the use of the screw mechanism 86 as a conversion mechanism for converting a rotational motion of the motor 84 into a linear motion, it is possible to perform the switching operation of the high-low switching mechanism 48 and the torque adjustment of the front-wheel driving clutch 50 by the same system. Hereby, it is possible to perform, with accuracy, the switching operation of the high-low switching mechanism 48 and the torque adjustment of the front-wheel driving clutch 50, based on the motor rotation angle Am of one motor 84. As a result, it is possible to avoid an increase in dimension for convenience of control and an increase in cost due to adoption of multiple sensors in the power transmission device 18.

Further, according to the present embodiment, the switching controlling portion 220 performs adjustment of a transmission torque of the front-wheel driving clutch 50 by taking, as the H4 reference point, a motor rotation angle Am (e.g., a position where the frictional engagement element 80 is pressed by the piston 82 by a predetermined amount at the high gear position of the fork shaft 102) at which the transmission torque of the front-wheel driving clutch 50 exceeds a predetermined value. Further, the switching controlling portion 220 performs the switching operation of the high-low switching mechanism 48 based on the H4 reference point and the moving dimension in design in the linear motion of the nut member 94. Accordingly, it is possible to perform, with accuracy, the switching operation of the high-low switching mechanism 48 and the torque adjustment of the front-wheel driving clutch 50, based on the motor rotation angle Am of one motor 84.

Further, according to the present embodiment, the reference-point determination portion 222 applies a predetermined current to the motor 84 so as to rotate the motor 84 toward a side where a transmission torque of the front-wheel driving clutch 50 is generated (that is, toward a side where the piston 82 presses the frictional engagement element 80). Then, the reference-point determination portion 222 determines, as the H4 reference point, a motor rotation angle Am obtained by further rotating the motor 84 just by a predetermined reference angle from a motor rotation angle Am at the time when the rotation of the motor 84 stops, or a motor rotation angle Am at the time when the current applied to the motor 84 is increased by a predetermined reference current. Here, the reference point for respective motor rotation angles Am based on which the switching operation of the high-low switching mechanism 48 and the torque adjustment of the front-wheel driving clutch 50 are performed is set appropriately.

Further, according to the present embodiment, the switching controlling portion 220 stores, as the H2 position, the motor rotation angle Am obtained by rotating the motor 84 just by the first predetermined rotation angle toward a side where the piston 82 does not press the frictional engagement element 80, relative to the H4 reference point, and stores, as the L4 position, the motor rotation angle Am obtained by rotating the motor 84 just by the second predetermined rotation angle toward the side where the piston 82 does not press the frictional engagement element 80, relative to the H4 reference point. Accordingly, the motor 84 can be controlled appropriately to a motor rotation angle Am for causing a vehicle state in which a rotation of a relatively high-speed side can be transmitted to the rear-wheel-side output shaft 44, based on the H4 reference point. Further, in the vehicle state, the motor 84 can be controlled appropriately to a motor rotation angle Am at which a torque adjusted via the front-wheel driving clutch 50 can be transmitted to the drive gear 46, based on the H4 reference point. Further, in the vehicle state, the motor 84 can be controlled appropriately to a motor rotation angle Am at which a power can be transmitted to only the rear wheels 16, based on the H4 reference point. Furthermore, the motor 84 can be controlled appropriately to a motor rotation angle Am for causing a vehicle state in which a rotation of a relatively low-speed side can be transmitted to the rear-wheel-side output shaft 44, based on the H4 reference point. Further, in the vehicle state, the motor 84 can be controlled appropriately to a motor rotation angle Am at which the rear-wheel-side output shaft 44 is directly connected to the drive gear 46 via the differential lock mechanism 58.

Further, in the present embodiment, since the transmission mechanism 88 transmits a linear motion force of the screw mechanism 86 to the differential lock mechanism 58, a switching operation (that is, power transmission/cutoff to the drive gear 46) of the differential lock mechanism 58 can be performed by the same system using the screw mechanism 86.

Further, in the present embodiment, since the lock sleeve 70 is provided in a space between the high-low switching mechanism 48 and the drive gear 46 so as to be adjacent to the high-low sleeve 62 as a different member, and the transmission mechanism 88 includes the first spring 72 and the second spring 74, the high-low sleeve 62 is movable regardless of whether the lock sleeve 70 moves or not. Further, even in a case where the high-low sleeve 62 is provided separately from the lock sleeve 70, if the high-low sleeve 62 is moved toward a side to be distanced from the lock sleeve 70, the lock sleeve 70 is moved toward a side to be distanced from the lock teeth 68.

Further, in the present embodiment, the transmission mechanism 88 includes the connecting mechanism 106. Accordingly, in a vehicle state where the high-low sleeve 62 is meshed with the high-gear teeth 64 so that a rotation of the relatively high-speed side can be transmitted to the rear-wheel-side output shaft 44 (in other words, the rear wheel 16), a torque adjusted via the front-wheel driving clutch 50 can be transmitted to the drive gear 46 (in other words, the front wheels 14). Further, in this vehicle state, the lock sleeve 70 is not meshed with the lock teeth 68, and the front-wheel driving clutch 50 can be set so as not to be pressed by the piston 82. Accordingly, a power can be transmitted to only the rear wheels 16. On the other hand, in a vehicle state where the high-low sleeve 62 is meshed with the low-gear teeth 66 and a rotation of the relatively low-speed side can be transmitted to the rear-wheel-side output shaft 44, the lock sleeve 70 is meshed with the lock teeth 68, so that the rear-wheel-side output shaft 44 is directly connected to the drive gear 46 via the differential lock mechanism 58.

Further, in the present embodiment, since the screw mechanism 86 is a ball screw, a high thrust can be given to the front-wheel driving clutch 50 by a high magnification function of the ball screw. Further, a necessary stroke for the operation of the high-low switching mechanism 48 can be obtained by the ball screw. Further, mechanical efficiency to convert a rotational motion into a linear motion can be increased in comparison with a case of using a slide screw as the conversion mechanism for converting a rotational motion of the motor 84 into a linear motion.

The embodiment of the present invention has been described in detail with reference to the drawings, but the present invention is applied to other aspects.

For example, in the above embodiment, a ball screw is exemplified as the screw mechanism 86, but the present invention is not limited to this aspect. For example, the screw mechanism 86 may be a mechanism configured such that a shaft of a simple bolt is combined with a nut, as long as the screw mechanism 86 serves as a conversion mechanism for converting a rotational motion of the motor 84 into a linear motion. More specifically, the screw mechanism 86 may be a slide screw. In a case of a slide screw, mechanical efficiency to convert a rotational motion into a linear motion is set lower than the ball screw, but such a certain effect is obtained that a high thrust can be given to the front-wheel driving clutch 50, and a necessary stroke for the operation of the high-low switching mechanism 48 can be obtained.

Further, in the above embodiment, the screw mechanism 86 is indirectly connected to the motor 84 via the worm gear 90. However, the present invention is not limited to this aspect. For example, the screw shaft member 92 of the screw mechanism 86 may be directly connected to the motor 84 without using the worm gear 90. More specifically, the screw shaft member 92 may be directly connected to the motor 84, so that the pinion provided in the motor shaft of the motor 84 meshes with gear teeth formed in the screw shaft member 92.

Further, in the above embodiment, as the H4 reference point, a motor rotation angle Am obtained by further rotating the motor 84 by the predetermined reference angle from a motor rotation angle Am (e.g., the clutch pressure-contact start point in FIG. 4) at the time when a rotation of the motor 84 stops. However, the present invention is not limited to this aspect. For example, a predetermined amount to move the piston 82 toward the pressing side from the clutch pressure-contact start point is set to zero (that is, the predetermined reference angle is set to zero), and the clutch pressure-contact start point at this time may be determined as the H4 reference point. Even with this configuration, it is possible to obtain the same effect as in the above embodiment. Further, the L4 position is determined by calculation based on the H4 reference point and then stored. However, the L4 position may be determined by actually rotating the motor 84, or the L4 position determined by calculation may be corrected based on the L4 position thus determined by actually rotating the motor 84. The L4 position determined by actually rotating the motor 84 may be, for example, a motor rotation angle Am obtained such that, from a position where the rotation of the motor 84 stops after the fork shaft 102 is moved across the low gear position from a high-gear-position side, the motor 84 is rotated just by a predetermined rotation amount so as to move the fork shaft 102 to the high-gear-position side. Alternatively, the L4 position determined by actually rotating the motor 84 may be a motor rotation angle Am at the time when a low gear position detection signal Plow is input.

Further, in the above embodiment, an FR-based four-wheel drive vehicle is exemplified as the vehicle 10 to which the transfer 22 is applied, but the present invention is not limited to this. For example, the vehicle 10 to which the transfer 22 is applied may be a four-wheel drive vehicle based on front-engine front wheel drive (FF). Further, the front-wheel driving clutch 50 is a multi-disc clutch, but the present invention can be also applied to a single-disc clutch. Further, the transfer 22 may not include the gear position maintaining mechanism 120 and the low gear position sensing switch 130.

Further, in the above embodiment, as the engine 12 exemplified as a driving force source, an internal combustion engine such as a gasoline engine or a diesel engine is used, for example. Further, as the driving force source, other motors such as an electric motor can be employed solely, or in combination with the engine 12. Further, the transmission 20 may be various automatic transmissions such as a planetary gear multi-stage transmission, a continuously variable transmission, and a synchromesh parallel two-shaft transmission (including a well-known DCT), or a well-known manually shifted transmission. Further, the front-side clutch 36 is an electromagnetic dog clutch, but the present invention is not limited to this. For example, the front-side clutch 36 may be a dog clutch including a shift fork for axially moving a sleeve and driving the shift fork by an actuator that can be electrically controlled or hydraulically controlled, a friction clutch, and the like.

These are merely one embodiment to the utmost, and the present invention can be performed in an embodiment to which various changes and improvements are added based on the knowledge of a person skilled in the art.

What is claimed is:

1. A power transmission device for a vehicle, the power transmission device comprising:
    a transfer including
        an input rotational member,
        a first output rotational member configured to output a power to first right and left wheel assemblies,
        a second output rotational member configured to output a power to second right and left wheel assemblies,
        a high-low switching mechanism configured to change a speed of a rotation of the input rotational member and, the high-low switching mechanism being configured to transmit the rotation to the first output rotational member,
        a clutch configured to adjust a transmission torque to be transmitted from the first output rotational member to the second output rotational member,
        a motor,
        a screw mechanism configured to convert a rotational motion of the motor into a linear motion,
        a transmission mechanism configured to transmit a linear motion force of the screw mechanism to the high-low switching mechanism and the clutch, and
        a rotation angle sensor configured to detect a rotation angle of the motor; and
    at least one electronic control unit configured to perform a switching operation of the high-low switching mechanism and adjustment of the transmission torque of the clutch, based on the rotation angle of the motor.

2. The power transmission device according to claim 1, wherein
    the electronic control unit is configured to
        i) perform the adjustment of the transmission torque of the clutch by taking, as a reference point, a rotation angle of the motor at which the transmission torque of the clutch exceeds a predetermined value, and
        ii) perform the switching operation of the high-low switching mechanism based on the reference point and a moving dimension in design in the linear motion of the screw mechanism.

3. The power transmission device according to claim 2, wherein
    the electronic control unit is configured to
        i) apply a predetermined current to the motor and rotate the motor such that the transmission torque of the clutch is generated, and ii) determine, as the reference point, one of a) a rotation angle at a time when the rotation of the motor stops, b) a rotation angle obtained by further rotating the motor by a predetermined reference angle from the rotation angle at a time when the rotation of the motor stops, and c) a rotation angle of the motor at a time when the current applied to the motor increases by a predetermined reference current.

4. The power transmission device according to claim 1, wherein:
the screw mechanism includes
a rotational member connected to the motor, and
a rectilinearly-movable member connected to the rotational member in a movable manner in a direction parallel to a shaft center of the rotational member along with a rotation of the rotational member;
the high-low switching mechanism includes
high-gear teeth configured to output a rotation,
low-gear teeth configured to output a rotation at a lower speed than the high-gear teeth, and
a high-low sleeve splined to the first output rotational member such that the high-low sleeve meshes with the high-gear teeth and the low-gear teeth along with a movement in a direction parallel to a shaft center of the first output rotational member; and
the transmission mechanism includes
a pressing member connected to the rectilinearly-movable member such that the pressing member presses the clutch,
a fork shaft provided around another shaft center parallel to the shaft center of the rotational member and the fork shaft being connected to the rectilinearly-movable member, and
a fork secured to the fork shaft and the fork being connected to the high-low sleeve.

5. The power transmission device according to claim 4, wherein:
the transfer includes
lock teeth provided in the second output rotational member, and
a dog clutch having a lock sleeve, the lock sleeve splined to the first output rotational member, so as to mesh with the lock teeth along with a movement in the direction parallel to the shaft center of the first output rotational member; and
the transmission mechanism is configured to transmit the linear motion force of the screw mechanism to the lock sleeve via the high-low sleeve.

6. The power transmission device according to claim 5, wherein:
the high-low sleeve is provided in a space on a second-output-rotational-member side relative to a support bearing of the input rotational member;
the lock sleeve is provided in a space between the high-low switching mechanism and the second output rotational member such that the lock sleeve is adjacent to the high-low sleeve as a different member; and
the transmission mechanism includes
a first spring configured to bias the high-low sleeve and the lock sleeve such that the high-low sleeve and the lock sleeve are distanced from each other, and
a second spring configured to bias the lock sleeve such that the lock sleeve separates from the lock teeth.

7. The power transmission device according to claim 6, wherein:
the high-low sleeve meshes with the high-gear teeth on a side to be distanced from the lock sleeve;
the high-low sleeve meshes with the low-gear teeth on a side to approach the lock sleeve;
the lock sleeve meshes with the lock teeth at a position where the fork shaft meshes the high-low sleeve with the low-gear teeth;
the clutch is placed around the shaft center of the first output rotational member on an opposite side to the high-low switching mechanism across the second output rotational member in a shaft-center direction of the first output rotational member such that the clutch is pressed by the pressing member moving toward the second output rotational member;
the clutch is pressed by the pressing member at a position where the fork shaft meshes the high-low sleeve with the high-gear teeth, and the clutch is not pressed by the pressing member at a position where the fork shaft meshes the high-low sleeve with the low-gear teeth;
the transmission mechanism includes a connecting mechanism configured to connect the rectilinearly-movable member to the fork shaft; and
the connecting mechanism is configured to allow the rectilinearly-movable member to move between a position where the clutch is pressed by the pressing member and a position where the clutch is not pressed by the pressing member, still at the position where the fork shaft meshes the high-low sleeve with the high-gear teeth.

8. The power transmission device according to claim 7, wherein
the electronic control unit is configured to
i) perform the adjustment of the transmission torque of the clutch, by taking, as a reference point, a position where the clutch is pressed by the pressing member by a predetermined amount at a position where the high-low sleeve meshes with the high gear teeth, and
ii) perform the switching operation of the high-low switching mechanism based on the reference point and a moving dimension in design in the rectilinearly-movable member.

9. The power transmission device according to claim 8, wherein
the electronic control unit is configured to
i) apply a predetermined current to the motor and rotate the motor such that the pressing member presses the clutch,
ii) determine, as the reference point, one of a) a rotation angle at a time when the rotation of the motor stops, b) a rotation angle obtained by further rotating the motor by a predetermined reference angle from the rotation angle at a time when the rotation of the motor stops, and c) a rotation angle of the motor at a time when the current applied to the motor increases by a predetermined reference current,
iii) store a rotation angle of the motor which is obtained by rotating the motor relative to the reference point just by a first predetermined rotation angle in a direction opposite to a direction in which the pressing member presses the clutch, the rotation angle being stored as a position where the clutch is not pressed by the pressing member at a position where the high-low sleeve meshes with the high gear teeth, and
iv) store a rotation angle of the motor which is obtained by rotating the motor relative to the reference point just by a second predetermined rotation angle that is larger than the first predetermined rotation angle in a direction opposite to a direction in which the pressing member presses the clutch, the rotation angle being stored as a position where the high-low sleeve meshes with the low gear teeth and the lock sleeve meshes with the lock teeth.

10. The power transmission device according to claim 4, wherein:
the rotational member is a screw shaft member;
the rectilinearly-movable member is a nut member; and
the screw mechanism is a ball screw configured such that the screw shaft member and the nut member operate via balls.

* * * * *